US012128437B2

(12) United States Patent
Mei et al.

(10) Patent No.: US 12,128,437 B2
(45) Date of Patent: Oct. 29, 2024

(54) ALL-PLASTIC EXTERNAL FOAM PUMP AND FOAM GENERATING METHOD THEREOF

(71) Applicant: Guangdong Neat Packaging Co., LTD., Guangdong (CN)

(72) Inventors: Yuanhong Mei, Guangdong (CN); Zhiyun Zeng, Guangdong (CN)

(73) Assignee: Guangdong Neat Packaging Co., LTD., Guangdong (CN)

( * ) Notice: Subject to any disclaimer, the term of this patent is extended or adjusted under 35 U.S.C. 154(b) by 0 days.

(21) Appl. No.: 17/796,274

(22) PCT Filed: Oct. 12, 2021

(86) PCT No.: PCT/CN2021/123226
§ 371 (c)(1),
(2) Date: Jul. 29, 2022

(87) PCT Pub. No.: WO2022/267265
PCT Pub. Date: Dec. 29, 2022

(65) Prior Publication Data
US 2023/0415177 A1    Dec. 28, 2023

(30) Foreign Application Priority Data
Jun. 21, 2021  (CN) .......................... 202110683149.4

(51) Int. Cl.
*B05B 7/00*    (2006.01)
*B05B 7/04*    (2006.01)
(52) U.S. Cl.
CPC ............ *B05B 7/005* (2013.01); *B05B 7/0425* (2013.01)

(58) Field of Classification Search
CPC ... B05B 7/005; B05B 7/0425; B05B 11/1077; B05B 7/0037; B05B 11/1074;
(Continued)

(56) References Cited

U.S. PATENT DOCUMENTS 4,607,765 A * 8/1986 Ruscitti ............... B05B 11/1047
417/511
5,938,084 A * 8/1999 Fuchs ................. B05B 11/0005
222/321.2
(Continued)

FOREIGN PATENT DOCUMENTS

CN    210213344    3/2020
CN    211811090    10/2020
(Continued)

OTHER PUBLICATIONS

"International Search Report (Form PCT/ISA/210) of PCT/CN2021/123226," mailed on Jan. 27, 2022, pp. 1-5.
(Continued)

*Primary Examiner* — Donnell A Long
(74) *Attorney, Agent, or Firm* — JCIPRNET

(57) ABSTRACT

An all-plastic external foam pump, including an actuator, a fixing member, a plunger, an elastic member, a cylinder body, and a straw, is provided. One end of the fixing member is fixed or detachably connected to the actuator, and the other end is fixed or detachably connected to the plunger. The fixing member is at least partially accommodated in the cylinder body. One end of the plunger is penetrated into the elastic member. The straw is installed on one end of the cylinder body. A pulling rod is disposed in the plunger. The pulling rod is disposed in linkage with the plunger. The elastic member is made of a recyclable elastic material. A liquid mixing portion is disposed in the fixing member.

10 Claims, 3 Drawing Sheets

(58) Field of Classification Search
CPC .............. B05B 11/1087; B05B 11/1042; B05B 11/1001; B05B 11/1081; Y02W 30/80
See application file for complete search history.

(56) References Cited

U.S. PATENT DOCUMENTS

2013/0043283 A1\* 2/2013 Lin ..................... B05B 11/1087
222/401
2016/0318053 A1 11/2016 De Jong
2019/0083995 A1\* 3/2019 Knight ................ B05B 11/1074
2022/0371037 A1\* 11/2022 Rossignol ........... B05B 11/1087

FOREIGN PATENT DOCUMENTS

| CN | 112173408 | | 1/2021 | | |
|----|-----------|---|--------|---|---|
| CN | 112173408 | A \* | 1/2021 | ......... | B05B 11/3001 |
| CN | 212739099 | | 3/2021 | | |
| CN | 215400420 | | 1/2022 | | |
| WO | WO-2014099243 | A1 \* | 6/2014 | ......... | B05B 11/0064 |

OTHER PUBLICATIONS

"Written Opinion of the International Searching Authority (Form PCT/ISA/237) of PCT/CN2021/123226," Jan. 27, 2022, pp. 1-7.

\* cited by examiner

ALL-PLASTIC EXTERNAL FOAM PUMP AND FOAM GENERATING METHOD THEREOF

CROSS-REFERENCE TO RELATED APPLICATION

This application is a 371 of international application of PCT application serial no. PCT/CN2021/123226, filed on Oct. 12, 2021, which claims the priority benefit of China application no. 202110683149.4, filed on Jun. 21, 2021. The entirety of each of the above-mentioned patent applications is hereby incorporated by reference herein and made a part of this specification.

TECHNICAL FIELD

The disclosure relates to the technical field of foam pumps, and in particular to an all-plastic external foam pump and a foam generating method thereof.

DESCRIPTION OF RELATED ART

With the progress of society, more and more products that can facilitate daily lives of people are now widely used in the lives of people. Now, people are more concerned about their own health and hygiene issues. In order to keep the body clean, people are accustomed to cleaning with some cleaning liquids when washing their hands, faces, or bathing nowadays. In order to meet the demand of people, there are a great number of cleaning liquids such as face wash, hand soap, and shower gel on the market. For convenience of use, the liquids are generally placed in bottle-like containers, and people extrude the liquids in the containers through pressing the actuators for use.

Currently, such type of foam pumps all adopt metal springs as reset components. After a liquid is taken out, each component of the foam pump restores to the original position due to the restoration from deformation of the metal spring. However, when the foam pump needs to be recycled after being used, since the foam pump is made of plastic materials except for the metal spring, when recycling, it is necessary to first disassemble the entire foam pump, and then separately recycle the metal spring and other materials of the foam pump, which makes the whole recycling work cumbersome, increases working time, and reduces working efficiency.

SUMMARY

Based on this, it is necessary to provide an all-plastic external foam pump that can implement quick recycling and a foam generating method thereof.

An all-plastic external foam pump includes an actuator, a fixing member, a plunger, an elastic member, a cylinder body, and a straw. One end of the fixing member is fixed or detachably connected to the actuator, and other end is fixed or detachably connected to the plunger. The fixing member is at least partially accommodated in the cylinder body. One end of the plunger is penetrated into the elastic member. The straw is installed on one end of the cylinder body. A pulling rod is disposed in the plunger. The pulling rod is disposed in linkage with the plunger. The elastic member is made of a recyclable elastic material. A liquid mixing portion is disposed in the fixing member.

In an embodiment, the elastic member includes an upper elastic portion, a lower elastic portion, and a fixing ring. The upper elastic portion and the lower elastic portion are fixedly connected by the fixing ring.

In an embodiment, the elastic member includes a first elastic member and a second elastic member. The first elastic member and the second elastic member are an axisymmetric integral molding structure.

In an embodiment, the elastic member is an egg-shaped structure.

In an embodiment, one end of the cylinder body has a glass bead.

In an embodiment, the elastic member is made of a plastic material.

In an embodiment, the foam pump further includes an elastic member fixing base. The elastic member fixing base is installed in the cylinder body.

In an embodiment, the foam pump further includes a filter member. One end of the filter member is fixedly connected to the fixing member. A filter net is disposed in the filter member.

A foam generating method of an all-plastic external foam pump includes the following steps.

In S1, an actuator is pressed, so that the actuator moves toward an elastic member.

In S2, the actuator drives a fixing member to move toward the elastic member.

In S3, the fixing member drives a plunger to move toward the elastic member.

In S4, the plunger compresses the elastic member to deform the elastic member, so that a gas in a cylinder body enters a liquid mixing portion.

In S5, one end of the plunger is located in a small cylinder of the cylinder body while driving a pulling rod to move toward a straw.

In S6, a liquid enters the liquid mixing portion through a gap between the plunger and the pulling rod.

In S7, a foam flows out from the actuator.

In an embodiment, the elastic member fully fills an inner space of the cylinder body.

In the all-plastic external foam pump and the foam generating method thereof, through using the elastic member made of the recyclable elastic material, when the actuator is pressed down, the actuator drives the plunger to press down, so that the elastic member is deformed and fully compresses the inner space of the cylinder body, so that the gas in the cylinder body enters the liquid mixing portion. At the same time, one end of the plunger enters the small cylinder of the cylinder body while driving the pulling rod to move toward the straw. The liquid enters the liquid mixing portion through the gap between the plunger and the pulling rod. The foam flows out from the actuator. Since the elastic member is made of the recyclable bomb material, the elastic member may be recycled together with the foam pump during recycling, which is simple and convenient, and improves working efficiency. Moreover, the elastic member deforms and fully fills the inner space of the cylinder body, so that more gas may enter the liquid mixing portion, which enables the effect of the extruded foam to be better.

DETAILED DESCRIPTION OF DISCLOSED EMBODIMENTS

In order for the above objectives, features, and advantages of the disclosure to be more clearly understood, the specific implementations of the disclosure will be described in detail below with reference to the drawings. In the following description, numerous specific details are set forth in order to provide a thorough understanding of the disclosure. However, the disclosure can be implemented in many other ways different from those described herein, and persons skilled in the art can make similar improvements without departing from the connotation of the disclosure. Therefore, the disclosure is not limited by the specific embodiments disclosed below.

It should be noted that when an element is referred to as being "connected" to another element, the element be directly connected to the other element or there may also be an intervening element. In contrast, when an element is referred to as being "directly" connected to another element, there is no intervening element.

Unless otherwise defined, all technical and scientific terms used herein have the same meaning as commonly understood by persons skilled in the art to which the disclosure belongs. The terms used herein in the description of the disclosure are for the objective of describing specific implementations only and are not intended to limit the disclosure. As used herein, the term "and/or" includes any and all combinations of one or more of relevant listed items.

Figure 1:
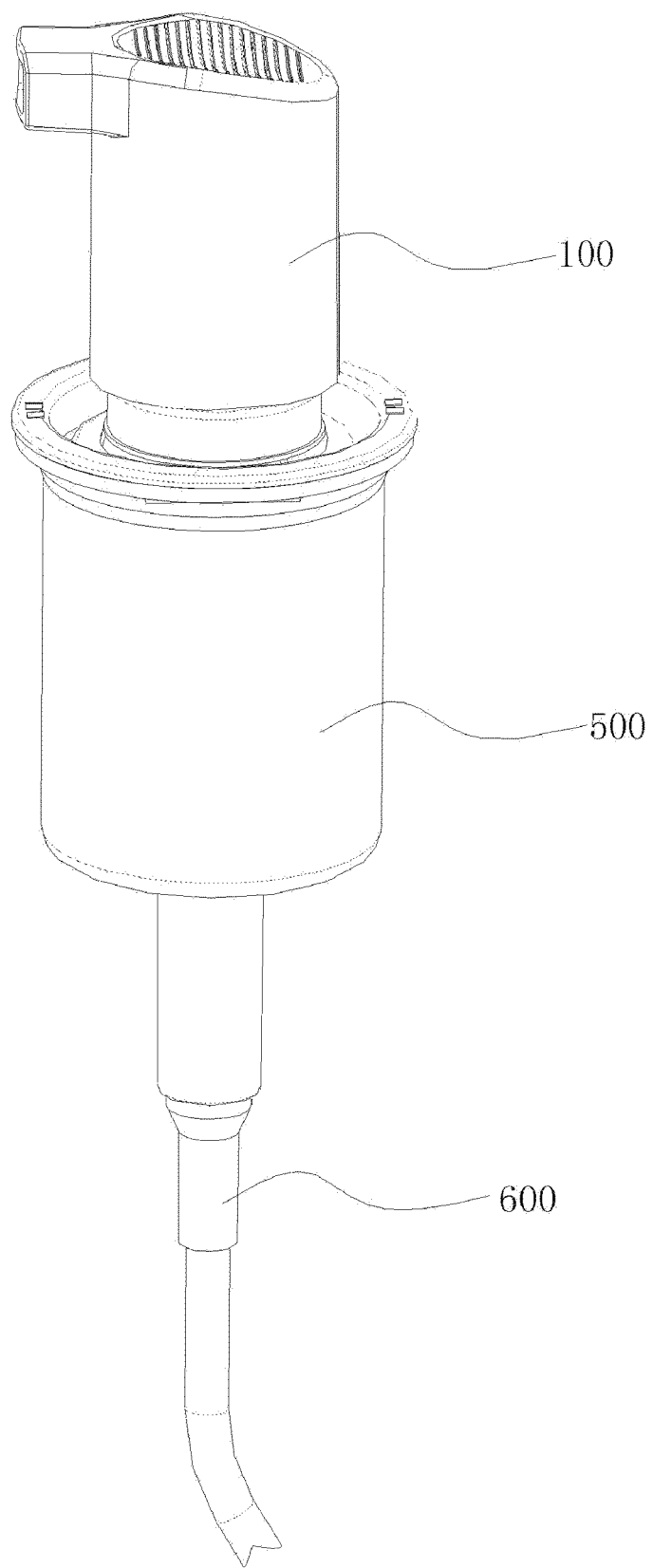
FIG. 1 is a schematic diagram of an assembly structure of an all-plastic external foam pump according to an embodiment of the disclosure.

As shown in FIG. 1, an all-plastic external foam pump includes an actuator 100, a fixing member 200, a plunger 300, an elastic member 400, a cylinder body 500, and a straw 600. One end of the fixing member 200 is fixed or detachably connected to the actuator 100, and the other end is fixed or detachably connected to the plunger 300. The fixing member 200 is at least partially accommodated in the cylinder body 500. One end of the plunger 300 is penetrated into the elastic member 400. The straw 600 is installed on one end of the cylinder body 500. A pulling rod 310 is disposed in the plunger 300. The pulling rod 310 is disposed in linkage with the plunger 300. The elastic member 400 is made of a recyclable elastic material. A liquid mixing portion 210 is disposed in the fixing member 200.

Figure 2:
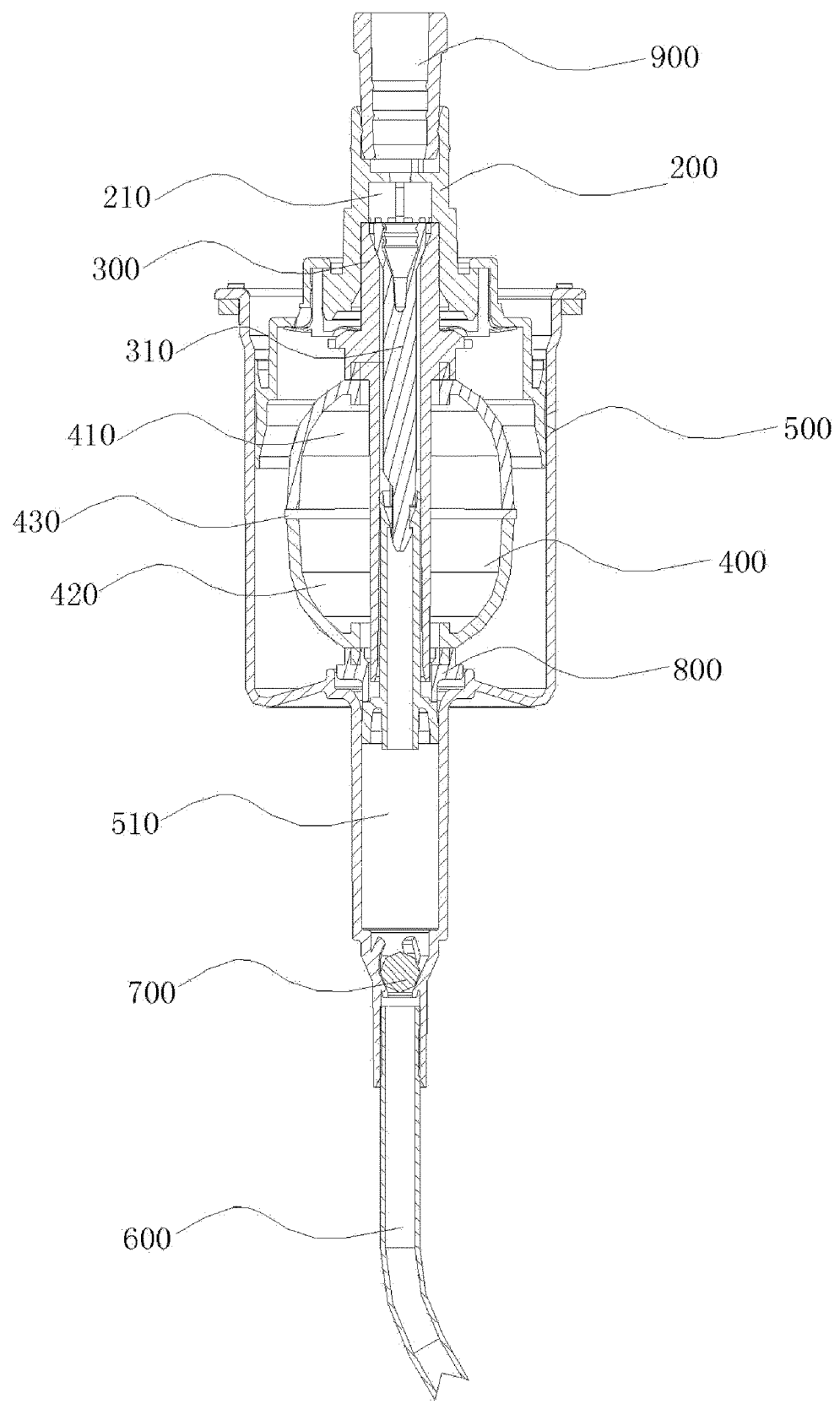
FIG. 2 is a schematic diagram of a cross-sectional structure of an all-plastic external foam pump according to an embodiment of the disclosure.

As shown in FIG. 2, in an embodiment, the elastic member 400 includes an upper elastic portion 410, a lower elastic portion 420, and a fixing ring 430. The upper elastic portion 410 and the lower elastic portion 420 are fixedly connected by the fixing ring 430.

Figure 3:
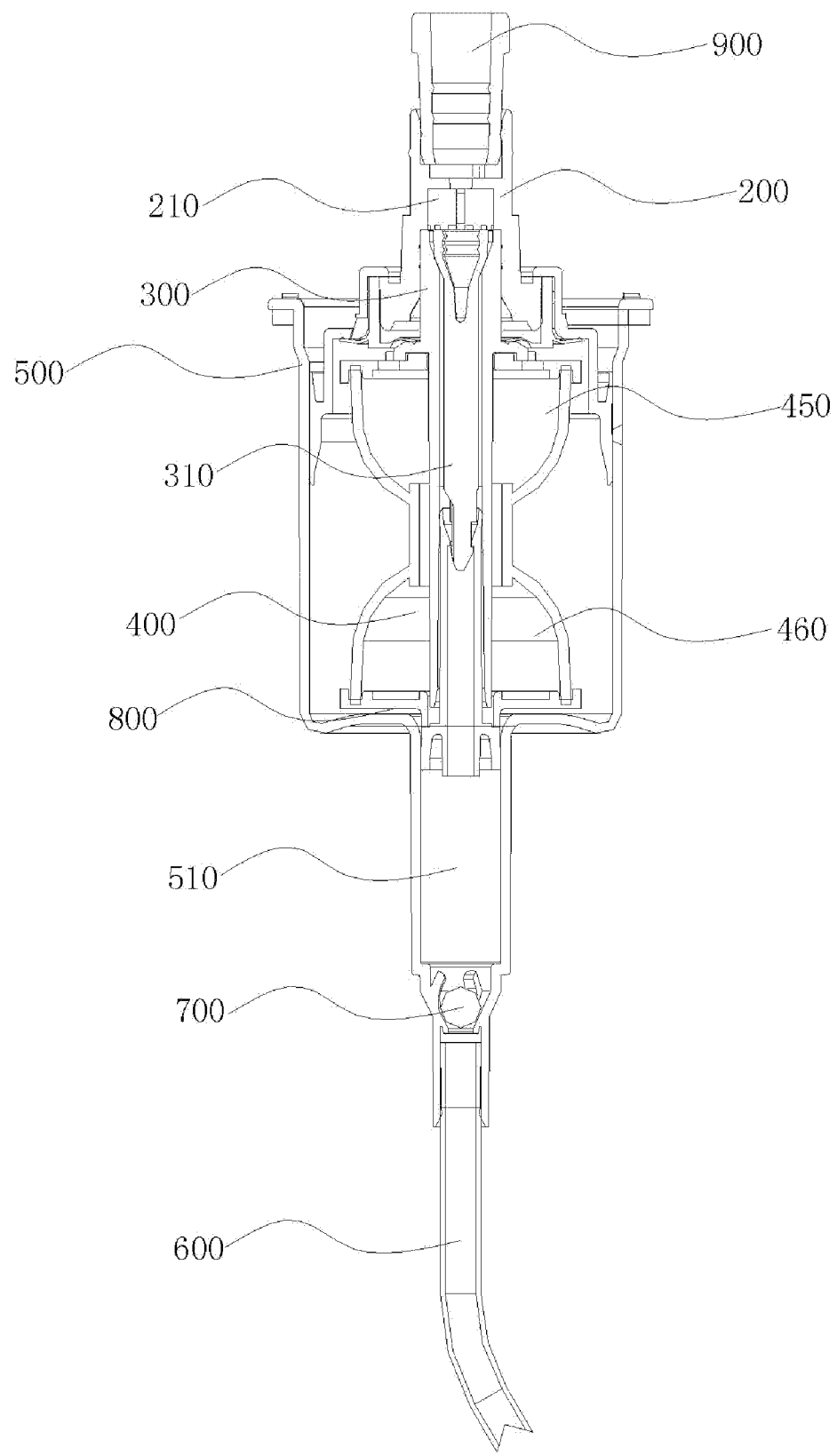
FIG. 3 is a schematic diagram of a cross-sectional structure of an all-plastic external foam pump according to another embodiment of the disclosure.

As shown in FIG. 3, in an embodiment, the elastic member 400 includes a first elastic member 440 and a second elastic member 450. The first elastic member 440 and the second elastic member 450 are an axisymmetric integral molding structure.

In an embodiment, the elastic member 400 is an egg-shaped structure.

In an embodiment, one end of the cylinder body 500 has a glass bead 700.

In an embodiment, the elastic member 400 is made of a plastic material.

In an embodiment, the foam pump further includes an elastic member fixing base 800.

The elastic member fixing base 800 is installed in the cylinder body 500.

In an embodiment, the foam pump further includes a filter member 900. One end of the filter member 900 is fixedly connected to the fixing member 200. A filter net is disposed in the filter member 900.

A foam generating method of an all-plastic external foam pump includes the following steps.

In S1, the actuator 100 is pressed, so that the actuator 100 moves toward the elastic member 400.

In S2, the actuator 100 drives the fixing member 200 to move toward the elastic member 400.

In S3, the fixing member 200 drives the plunger 300 to move toward the elastic member 400.

In S4, the plunger 300 compresses the elastic member 400 to deform the elastic member 400, so that a gas in the cylinder body 500 enters the liquid mixing portion 210.

In S5, one end of the plunger 300 is located in a small cylinder 510 of the cylinder body 500 while driving the pulling rod 310 to move toward the straw 600.

In S6, a liquid enters the liquid mixing portion 210 through a gap between the plunger 300 and the pulling rod 310.

In S7, a foam flows out from the actuator 100.

In an embodiment, the elastic member 400 fully fills an inner space of the cylinder body 500.

It should be noted that the elastic member 400 is made of the recyclable elastic material, wherein the recyclable elastic material is a conventional material and is recyclable. In an initial state, a predetermined amount of liquid is disposed in the small cylinder 510 of the cylinder body 500.

In Embodiment 1, the elastic member 400 is a split structure and includes the upper elastic portion 410, the lower elastic portion 420, and the fixing ring 430. The upper elastic portion 410 and the lower elastic portion 420 are fixedly connected by the fixing ring 430. In the embodiment, the upper elastic portion 410 and the lower elastic portion 420 are both bowl-shaped structures. The upper elastic portion 410 and the lower elastic portion 420 are buckled upside down together and are fixedly connected together by the fixing ring 430.

When the foam needs to be obtained, the actuator 100 is pressed, so that the actuator 100 moves toward the elastic member 400. The actuator 100 compresses the fixing member 200 to move toward the elastic member 400. The fixing member 200 compresses the plunger 300 to move toward the elastic member 400. The plunger 300 compresses the upper elastic portion 410. The lower elastic portion 420 abuts against the cylinder body 500, so that the upper elastic portion 410 and the lower elastic portion 420 are deformed to fully fill the inner space of the cylinder body 500, so that the gas in the cylinder body 500 enters the liquid mixing portion 210. One end of the plunger 300 is located in the small cylinder 510 of the cylinder body 500 while driving the pulling rod 310 to move toward the straw 600. At this time, there is a certain gap between the plunger 300 and the pulling rod 310. At this time, there is a certain amount of liquid in the small cylinder 510. The liquid enters the liquid mixing portion 210 through the gap between the plunger 300 and the pulling rod 310. The foam flows out from the actuator 100. The actuator 100 is released, and the elastic member 400 restores from deformation, so that other components restore to original positions.

In Embodiment 2, the elastic member 400 includes the first elastic member 440 and the second elastic member 450.

The first elastic member 440 and the second elastic member 450 are an integral molding structure. In the embodiment, the first elastic member 440 and the second elastic member 450 are both bowl-shaped structures, which is the integral molding structure with opposite bowl bottoms. Since bowl mouths are respectively outward, the bowl mouths may be made into the integral molding structure.

When the foam needs to be obtained, the actuator 100 is pressed, so that the actuator 100 moves toward the elastic member 400. The actuator 100 compresses the fixing member 200 to move toward the elastic member 400. The fixing member 200 compresses the plunger 300 to move toward the elastic member 400. The plunger 300 compresses the first elastic member 440. The second elastic member 450 abuts against the cylinder body 500, so that the first elastic member 440 and the second elastic member 450 are deformed to fully fill the inner space of the cylinder body 500, so that the gas in the cylinder body 500 enters the liquid mixing portion 210. One end of the plunger 300 is located in the small cylinder 510 of the cylinder body 500 while driving the pulling rod 310 to move toward the straw 600. At this time, there is a certain gap between the plunger 300 and the pulling rod 310. At this time, there is a certain amount of liquid in the small cylinder 510. The foam enters the liquid mixing portion 210 through the gap between the plunger 300 and the pulling rod 310. The foam flows out from the actuator 100.

In this way, in an all-plastic external foam pump, through using the elastic member 400 made of the recyclable elastic material, when the actuator 100 is pressed down, the actuator 100 drives the plunger 300 to press down, so that the elastic member 400 is deformed and fully compresses the inner space of the cylinder body 500, so that the gas in the cylinder body 500 enters the liquid mixing portion 210. At the same time, one end of the plunger 300 enters the small cylinder 510 of the cylinder body 500 while driving the pulling rod 310 to move toward the straw 600. The liquid enters the liquid mixing portion 210 through the gap between the plunger 300 and the pulling rod 310. The foam flows out from the actuator 100. Since the elastic member 400 is made of the recyclable elastic material, the elastic member 400 may be recycled together with the foam pump during recycling, which is simple and convenient, and improves working efficiency. Moreover, the elastic member 400 is deformed and fully fills the inner space of the cylinder body 500, so that more gas may enter the liquid mixing portion, which enables the effect of the extruded foam to be better.

In order to control the liquid entering the foam pump, one end of the cylinder body 500 has the glass bead 700.

In this way, when the foam needs to be obtained, one end of the plunger 300 is located in the small cylinder 510 of the cylinder body 500 while driving the pulling rod 310 to move toward the straw 600 to compress the glass bead 700 at a connecting portion between the small cylinder 510 and the straw 600, so that an external liquid does not enter the foam pump. When the actuator 100 is no longer pressed, the elastic member 400 restores from deformation. One end of the plunger 300 moves toward the actuator 100. The glass bead 700 moves toward the plunger 300 under the pressure of the external liquid. The liquid enters the small cylinder 510. The configuration of the glass bead 700 facilitates the liquid in entering the foam pump.

Further, in order to facilitate fixing the elastic member 400, the foam pump further includes the elastic member fixing base 800.

In this way, through fixing the elastic member 400 on the elastic member fixing base 800, the elastic member 400 does not move randomly, so that the foam pump may be used normally.

Further, in order to obtain a better foam effect, the foam pump further includes the filter member 900.

In this way, one end of the filter member 900 is fixedly connected to the fixing member 200. The filter net is disposed in the filter member 900. After a gas-liquid mixed liquid enters the filter member 900 from the liquid mixing portion 210, after being filtered by the filter net, the generated foam is denser and has better effect.

The technical features of the above embodiments may be combined arbitrarily. For the sake of brevity, not all possible combinations of the technical features in the above embodiments are described. However, as long as there is no contradiction between the combinations of the technical features, all should be regarded as being within the scope of the disclosure.

The above embodiments only represent several implementations of the disclosure, and the description thereof is specific and detailed, but should not be construed as a limitation to the scope of the disclosure. It should be pointed out that for persons skilled in the art, without departing from the concept of the disclosure, several modifications and improvements may also be made, which all belong to the protection scope of the disclosure. Therefore, the protection scope of the disclosure should be defined by the appended claims.

What is claimed is:

1. An all-plastic external foam pump, comprising: an actuator, a fixing member, a plunger, an elastic member, a cylinder body, and a straw, wherein one end of the fixing member is fixed or detachably connected to the actuator, other end of the fixing member is fixed or detachably connected to the plunger, the fixing member is at least partially accommodated in the cylinder body, one end of the plunger is penetrated into the elastic member, the straw is installed on one end of the cylinder body, a pulling rod is disposed in the plunger, the pulling rod is disposed in linkage with the plunger, the elastic member is made of a recyclable elastic material, and a liquid mixing portion is disposed in the fixing member,
wherein the elastic member is configured to deform in an axial direction and a radial direction of the cylinder body.

2. The all-plastic external foam pump according to claim 1, wherein the elastic member comprises an upper elastic portion, a lower elastic portion, and a fixing ring, and the upper elastic portion and the lower elastic portion are fixedly connected by the fixing ring.

3. The all-plastic external foam pump according to claim 2, wherein the elastic member comprises a first elastic member and a second elastic member, and the first elastic member and the second elastic member are an axisymmetric integral molding structure.

4. The all-plastic external foam pump according to claim 2, wherein the elastic member is an egg-shaped structure.

5. The all-plastic external foam pump according to claim 1, wherein one end of the cylinder body has a glass bead.

6. The all-plastic external foam pump according to claim 1, wherein the elastic member is made of a plastic material.

7. The all-plastic external foam pump according to claim 1, wherein the foam pump further comprises an elastic member fixing base, and the elastic member fixing base is installed in the cylinder body.

8. The all-plastic external foam pump according to claim 1, wherein the foam pump further comprises a filter member, one end of the filter member is fixedly connected to the fixing member, and a filter net is disposed in the filter member.

9. A foam generating method of an all-plastic external foam pump, comprising:
- S1, pressing an actuator, so that the actuator moves toward an elastic member;
- S2, driving a fixing member to move toward the elastic member by the actuator;
- S3, driving a plunger to move toward the elastic member by the fixing member;
- S4, compressing the elastic member to deform the elastic member in an axial direction and a radial direction of a cylinder body by the plunger, so that a gas in the cylinder body enters a liquid mixing portion;
- S5, driving a pulling rod to move toward a straw while one end of the plunger is located in a small cylinder of the cylinder body;
- S6, a liquid entering the liquid mixing portion through a gap between the plunger and the pulling rod;
- S7, a foam flowing out from the actuator.

10. The foam generating method of the all-plastic external foam pump according to claim 9, wherein the elastic member fully fills an inner space of the cylinder body.

* * * * *